W. C. GEBHARDT.
SAFETY VALVE MECHANISM FOR PNEUMATIC TIRES.
APPLICATION FILED JAN. 31, 1917.

1,261,018.

Patented Apr. 2, 1918.
2 SHEETS—SHEET 1.

Inventor
W. C. Gebhard
By his attorneys,
Baldwin & Wight

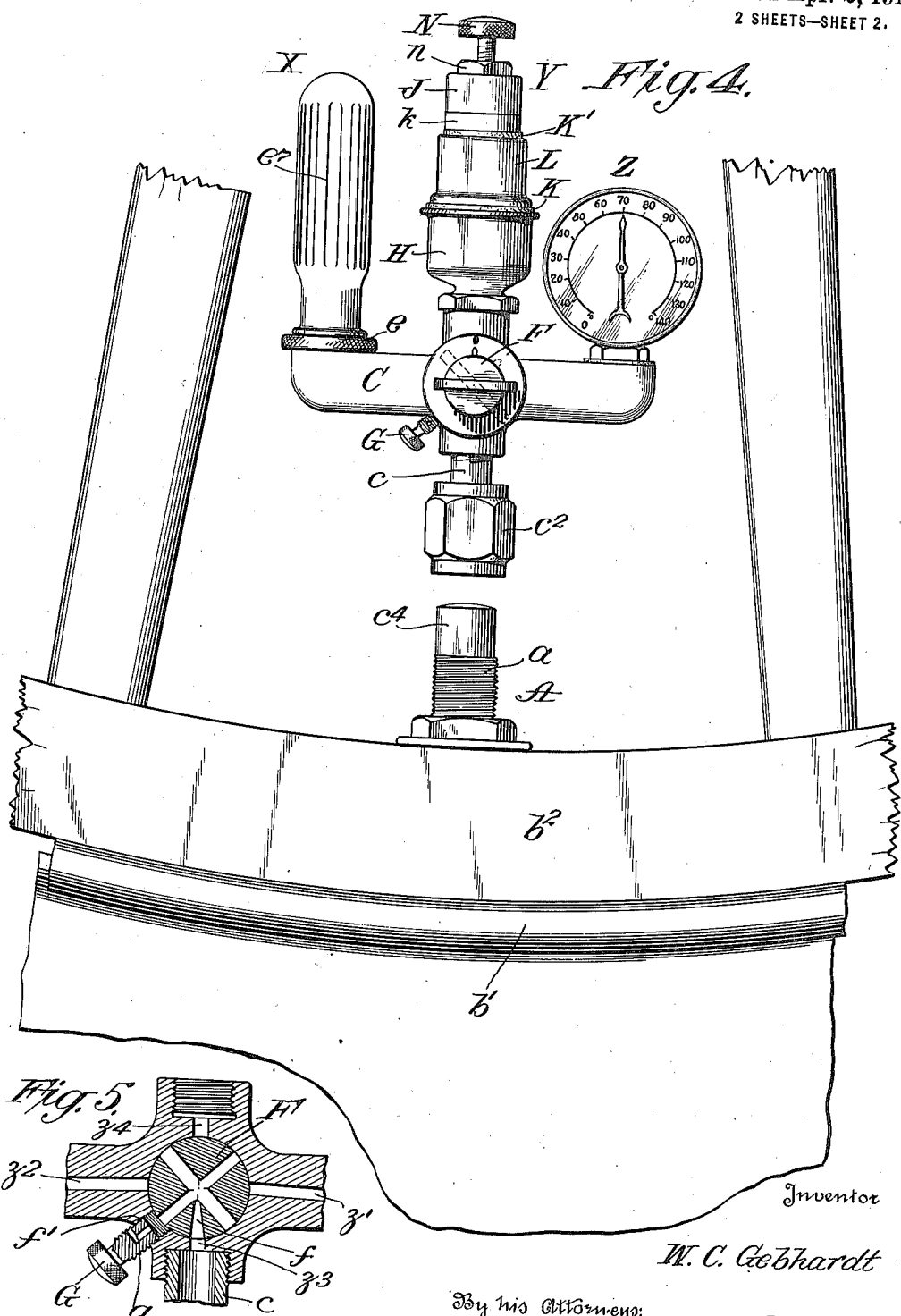

UNITED STATES PATENT OFFICE.

WILLIAM C. GEBHARDT, OF SAN ANTONIO, TEXAS.

SAFETY-VALVE MECHANISM FOR PNEUMATIC TIRES.

1,261,018. Specification of Letters Patent. Patented Apr. 2, 1918.

Application filed January 31, 1917. Serial No. 145,712.

*To all whom it may concern:*

Be it known that I, WILLIAM C. GEBHARDT, a citizen of the United States, residing at San Antonio, in the county of Bexar and State of Texas, have invented certain new and useful Improvements in Safety-Valve Mechanism for Pneumatic Tires, of which the following is a specification.

This invention relates to the valve mechanism of pneumatic tires and the particular object of the invention is to so construct such mechanism that the air pressure within the tire may be so regulated, governed or controlled that bursting of a tire by overcharging, by sudden compression, by overheating, etc., is avoided.

As is well understood the bursting of pneumatic tires is often caused by overcharging while inflating and bursting also often occurs when the tire is overheated or when it meets obstructions on the road which cause a sudden compression of the tire resulting in such an increase in pressure as to cause the breakage or disruption of the inner tube.

In carrying out my invention I provide a safety valve mechanism which may be easily applied to the ordinary charging valve commonly used on pneumatic tires. Such safety valve mechanism comprises three members, viz., an air inlet valve, a pressure gage and a safety or relief valve. These three members are all carried by a cross-head which is provided with passages connecting the three members with each other and also connecting them with the air charging valve of the tire. A controlling valve is mounted in the cross-head and serves to either establish communication between the air charging valve, the air inlet valve, the pressure gage and the safety or relief valve, or to close such communication and connect the air charging valve with a branch passage through which air may pass from the tire directly to the atmosphere, to thus deflate the tire or to reduce the pressure therein without passing through the automatic safety valve before referred to. The air inlet valve and the pressure gage may be of any suitable construction, but the automatic safety or relief valve which I employ is of improved construction and the details thereof will be hereinafter more fully described.

In the accompanying drawings,

Fig. 4 shows the valve mechanism in elevation and shows how it is applied to an automobile wheel.

Fig. 5 is a detail view of the controlling valve showing its position when adjusted to connect the inner tube with the atmosphere for the purpose of relieving the pressure in the tube.

The inflating or charging valve A is in general of a well known kind in extensive use and my improved safety valve mechanism is easily applied to it. The valve A comprises a body $a$ attached to the inner tube $b$ of the tire and passing outward through the rim $b'$ and felly $b^2$. The body $a$ is tubular, the bore $a'$ at the inner end of the body being of somewhat smaller diameter than the bore $a^2$ at the outer end, and in this bore or chamber $a^2$ is secured a valve seat $a^3$ associated with a valve $a^4$, carried by a rod $a^5$, the inner end of which passes through a guide $a^6$. A spring $a^7$, interposed between the guide $a^6$ and the valve $a^4$, tends to press the valve against its seat $a^3$ and, as ordinarily used, the valve $a^4$ is pressed against its seat by the spring $a^7$. According to my invention, however, means is provided for holding the valve $a^4$ normally open.

Figure 1:
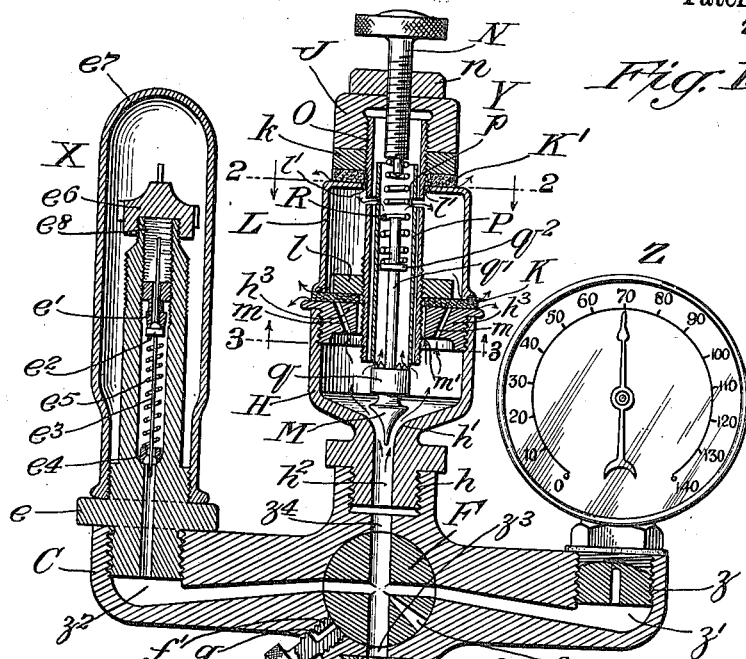
Figure 1 is a longitudinal central section through the valve mechanism embodying my improvements and shows how it is applied to the tire of an automobile wheel.
Figures 2, 3:
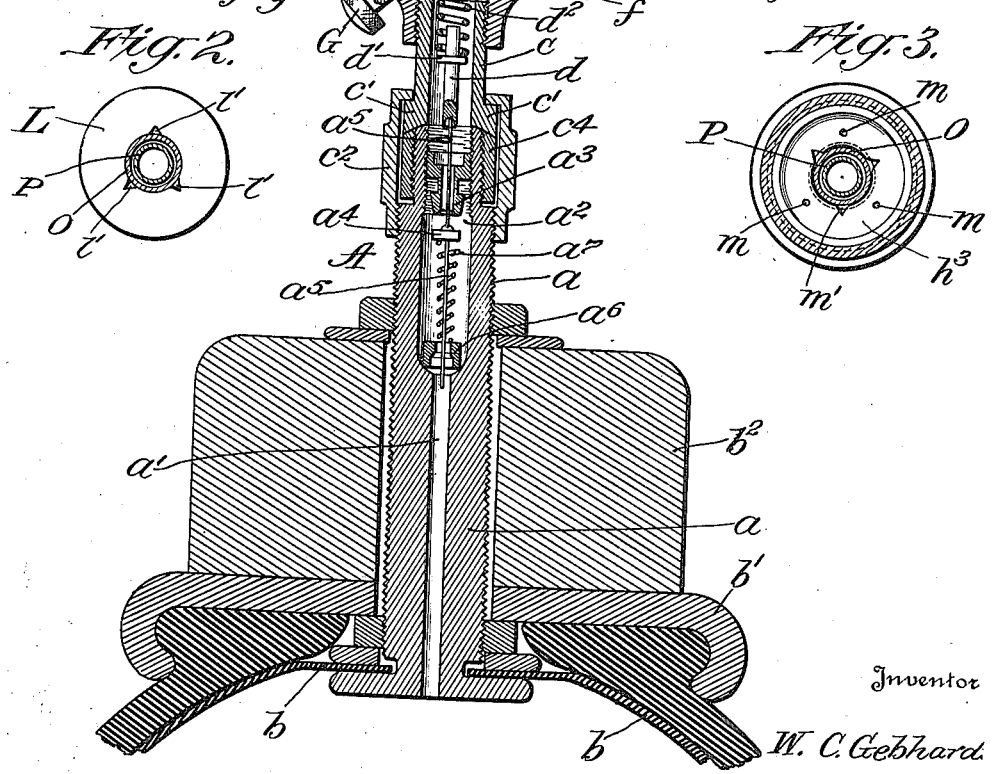
Fig. 2 is a detail view in section on the line 2—2 of Fig. 1.
Fig. 3 is a similar view on the line 3—3 of Fig. 1.

The valve mechanism which I employ comprises three main parts or members X, Y and Z, X being an air inlet valve or charging valve, Y an automatic safety or relief valve, and Z a pressure gage. These members are carried by a cross-head C, and this cross-head is connected with a short coupling member $c$, having a flanged portion $c'$ which engages a coupling sleeve $c^2$ that has a threaded connection with the threaded body $a$ of the charging valve A. As is usual the outer portion of the body $a$ is reduced in diameter and is threaded as clearly indicated in Fig. 1, and to this reduced threaded portion the tube of a charging pump is usually applied or coupled. I find it convenient to connect with said reduced threaded portion a collar $c^4$ which strengthens this part of the valve body and serves to support the flanged portion $c'$ of the coupling member $c$. It will be readily understood that in this way the cross-head C may be firmly connected with the tubular body of an ordinary charging valve. Within the member $c$ there is a rod $d$ carrying a collar $d'$ between which collar and the cross-head C is interposed a spring $d^2$. The lower end of the rod $d$ engages the upper end of the valve rod $a^5$ and the parts are so constructed and adjusted that when assembled in the manner shown in Fig. 1 the valve $a^4$ is held away from its seat against the pressure of the spring $a^7$; in other words, the valve is held normally open.

The air inlet valve X is in general similar to that shown at A. The body $e$ is attached to the cross-head C and within the tubular body there is a valve seat $e'$ and a valve $e^2$ carried by a valve rod $e^3$ which extends through a guide $e^4$. A spring $e^5$ holds the valve $e^2$ normally against its seat $e'$. $e^6$ indicates a cap for closing the outer end of the tubular body, and $e^7$ indicates an outside cap or casing for protecting the valve mechanism from mud, etc. When it is desired to operate the charging or inflating valve X the casing $e^7$ is removed and the cap $e^6$ is likewise removed. The pump may then be connected with the valve at the screw-threaded end $e^8$. As this mechanism is similar to mechanism already heretofore used further description is unnecessary. The pressure gage Z may be of any suitable construction and it is coupled to the cross-head at $z$ in any suitable way. A passage $z'$ leads from the pressure gage to the middle portion of the cross-head, and a passage $z^2$ leads from the air inlet to the middle portion of the cross-head where the controlling valve F is located, said controlling valve being mounted in a transverse opening in the middle portion of the cross-head. The passages $z'$ and $z^2$ connect with the opening and there is also the passage $z^3$ which connects the valve opening just referred to with the air inlet valve A. There is also a passage $z^4$ which connects with the automatic relief or safety valve Y. The controlling valve F is provided with passages which are clearly shown in Fig. 1 and readily understood, which provide communications through the valve F between the members X, Y and Z and the valve A, and when the valve is in the position shown in Fig. 1 communication between these members is established. The valve F is provided with an additional passage $f$ which is adapted to communicate with a passage $f'$ in the cross-head C which is normally closed by a valve G formed with an L-shaped passage $g$. The valve G is in the form of a screw-plug having a head by means of which it may be operated. When the valve G is in the position shown in Fig. 1, the passage $g$ is closed to the atmosphere, but when the valve is turned and moved to the position shown in Fig. 5, the passage $g$ communicates with the atmosphere. If at this time the controlling valve F be moved to the position indicated in Fig. 5, with the passage $f$ in communication with the valve A, air will pass from the tire or inner tube through the passage $f$, and also through the passage $g$ into the atmosphere. In this way the air pressure within the tire may be quickly relieved without having it pass through the automatic safety or relief valve and it will be observed in this connection that the valve $a^4$ is normally held in an open condition.

The automatic safety or relief valve Y is so constructed as to allow air to automatically escape when the pressure exceeds the pressure for which the said valve is set, and the construction is such as to permit air to escape, while mud and dust are excluded from the working parts of the apparatus.

The valve chamber H is suitably connected at $h$ to the cross-head C and it is provided with a valve seat $h'$ with which the valve M coöperates. The chamber H communicates by way of a passage $h^2$ with the passage $z^4$, in turn communicating with the passages in the valve F. The chamber H is provided with a closure $h^3$ which is preferably in the form of a screw plug. This screw plug is formed with passages $m$, three being shown, but any desired number being employed, which extend entirely through the plug. On top of the plug there is a washer K of felt or similar material of a loose fibrous nature, and over this there is a cap L, on the top of which is another washer of felt K′ which is held down by a nut $k$ over which there is a cap J through which extends an adjusting screw N carrying a lock nut $n$. A tube O extends through the plug $h^3$ and it carries a nut or collar $l$ which rests on the top of the felt washer K. The tube extends up through the washer K′ and the nut $k$ and into the cap J, and it has a threaded connection with the cap and with the nut $k$. The arrangement is such that the parts may be locked in the position shown. It will be further understood that the tube O has a threaded connection with the plug or collar $h^3$. Within the tube O there is another tube P which is serrated at its lower end and rests on the collar $q$ of the valve M at all times. The valve M has a valve rod or stem $q'$ carrying a collar $q^2$, and between this collar and the inner end of the screw N is interposed a spring R. The tube P is formed with openings $p$ registering with similar openings in the outer tube O when the parts are in the position shown in Fig. 1. When the pressure in the tire is of the desired degree the valve M is closed and the degree of pressure is indicated in the pressure gage. The valve $e^2$ is also closed but should the pressure in the tire for any reason be increased beyond that to which the valve M is set, then said valve will open and air will pass from the tire past the valve $a^4$ and into the air chamber H of the safety valve mechanism, the valve M being moved by said pressure to the position shown. Air from the chamber H will then pass through the openings $m$ forcing its passage through the felt washer K to the atmosphere in the manner indicated by the arrows. Air will also pass up through the openings $m'$ around the tube O, and then laterally through the felt washer to the atmosphere in the manner also indicated by the arrows. Air also passes into the inner tube O and also between the tubes O and P out into the casing L, from which the air passes through the washer K and also by way of openings $l'$ through the washer K' to the atmosphere. I have found this construction desirable because mud, dirt and water are kept from passing into the small passages formed in the metal parts of the valve while the internal pressure is such as to keep the felt washer clean and permit air to escape when necessary. By adjusting the screw N the valve mechanism may be set to operate at any desired pressure and is also sensitive to operate quickly when such pressure is exceeded, whether such excessive pressure be caused during the charging or inflating of the tire, by overheating of the tire, by obstructions on the road, or any other cause, and by thus quickly relieving the tire of pressure, bursting thereof is prevented and the life of the tire accordingly prolonged.

If the cross-head with the valve mechanism carried thereby be removed the valve $a^4$ will immediately close and operate in the usual way or in the manner heretofore incident to the operation of such valves, and it is also true that if by reason of a collision or other mishap the valve mechanism should be broken off at the part $c$ the valve stem $a^5$ would be released and the valve $a^4$ would immediately close, thus preventing the tire from becoming deflated. Experience has demonstrated in carefully directed tests that the valve mechanism operates efficiently in the manner before described, responding quickly to undesirable increases of tire pressure or such increases as would tend to burst the tire.

I claim as my invention:

1. A safety attachment for pneumatic tires comprising a cross-head carrying an air inlet valve and a pressure gage, a safety valve also carried by the cross-head and communicating with the pressure gage and the air valve through passages in the cross-head, and an intermediate controlling valve for placing said air inlet valve, safety valve and pressure gage in communication with the tire or for disconnecting them therefrom.

2. A safety valve attachment for pneumatic tires comprising a cross-head carrying an air inlet valve, a pressure gage and a safety valve which communicate with each other through passages in the cross-head, a centrally arranged valve chamber having communication with the pneumatic tire, the air inlet valve, the safety valve and the pressure gage, and having also communication with the atmosphere, a controlling valve in said valve chamber having passages for connecting the air inlet valve, the safety valve and the pressure gage with the tire and also a passage for connecting the tire with the atmosphere.

3. A safety valve attachment for pneumatic tires comprising a cross-head carrying an air inlet valve, a pressure gage and a safety valve which communicate with each other through passages in the cross-head, a centrally arranged valve chamber having communication with the pneumatic tire, the air inlet valve, the safety valve and the pressure gage and having also communication with the atmosphere, a controlling valve in said valve chamber having passages for connecting the air inlet valve, the safety valve and the pressure gage with the tire and also a passage for connecting the tire with the atmosphere, and an adjustable plug valve for opening and closing the passage which connects said valve chamber with the atmosphere.

4. A safety valve attachment for pneumatic tires comprising a safety valve in communication with the air pressure in the tire, and provided with a valve chamber having passages from it leading to the atmosphere, a covering of fibrous material for said passages, means for holding said fibrous material in position, and a valve in said valve chamber adapted to permit the escape of air from said tire to said valve chamber when a predetermined pressure is reached in said tire.

5. A safety valve attachment for pneumatic tires comprising a safety valve in communication with the air pressure in the tire and provided with a valve chamber having passages from it leading to the atmosphere, a covering of fibrous material for said passages, a cap for protecting said fibrous material from dirt, and a valve in said chamber adapted to permit the escape of air from said tire to said valve chamber when a predetermined pressure is reached in said tire.

6. A safety valve attachment for pneumatic tires comprising a cross-head carrying an air inlet valve, a pressure gage and a safety valve, said safety valve being provided with a valve chamber having passages from it leading to the atmosphere, a covering of fibrous material for said passages, a valve in said valve chamber, a spring for closing said valve, means for adjusting the tension of the spring to correspond with variations in pressure, and concentric tubes surrounding the spring and provided with air passages which are protected by coverings of fibrous material for the purpose specified.

In testimony whereof, I have hereunto subscribed my name.

WILLIAM C. GEBHARDT.